United States Patent [19]

Haubert

[11] 4,307,806
[45] Dec. 29, 1981

[54] INTEGRAL FOLDABLE PACKAGE

[75] Inventor: Carol A. Haubert, Upper-Grandview-on-the-Hudson, N.Y.

[73] Assignee: Raytheon Company, Lexington, Mass.

[21] Appl. No.: 121,624

[22] Filed: Feb. 14, 1980

[51] Int. Cl.³ .................. B65D 85/672; B65D 65/00; B42D 3/18
[52] U.S. Cl. .................................. 206/387; 206/486; 206/493; 206/45.33; 229/92.8
[58] Field of Search ............... 206/387, 806, 424, 214, 206/215, 486, 490, 493, 45.33; 229/92.8

[56] References Cited

U.S. PATENT DOCUMENTS

| | | | |
|---|---|---|---|
| 1,896,678 | 2/1933 | Myers | 206/214 |
| 2,646,876 | 7/1953 | Sparks | 229/92.8 |
| 3,587,837 | 6/1971 | Smith | 206/387 |
| 3,656,612 | 4/1972 | Sellors | 206/387 |
| 3,675,763 | 7/1972 | Sandel | 206/387 |
| 3,682,297 | 8/1972 | Austin et al. | 206/387 |
| 3,829,132 | 8/1974 | Willieme | 206/387 |
| 3,866,751 | 2/1975 | Holert | 206/387 |
| 3,973,674 | 8/1976 | Postlethwaite | 206/215 |
| 4,004,689 | 1/1977 | Glasell | 206/387 |
| 4,134,495 | 1/1979 | Friedman | 206/387 |

Primary Examiner—William T. Dixson, Jr.
Attorney, Agent, or Firm—John T. Meaney; Joseph D. Pannone; Richard M. Sharkansky

[57] ABSTRACT

An integral package for a cassette type article comprising a foldable member having first and second cover walls pivotally connected to a spine wall to form a book-like container, and having disposed between the cover walls a rectangular tubular compartment. The compartment has a side panel provided with a slotted opening dimensioned for receiving therein at least a portion of the article, and is disposed with respect to the spine wall for retaining the article in the compartment when the container is closed. The foldable member also may have a flap portion integrally connected to one of the cover walls along a perforated edge to provide a support hanger which may be used to support the package in retail displays and may be readily removed when the package is stored, similar to a book on a shelf, for example. The package may be enclosed in a shrink wrapping of clear plastic material, and has at least one open end portion whereby the presence of an article in the compartment may be ascertained without removing the wrapping and opening the book-like container.

19 Claims, 15 Drawing Figures

INTEGRAL FOLDABLE PACKAGE

BACKGROUND OF THE INVENTION

1. Field of the Invention

This invention relates generally to packages for tape cassette type articles, and is concerned more particularly with a package having a container and an integral cassette compartment foldably formed without the use of adhesives.

2. Discussion of the Prior Art

Tape cassettes bearing recorded subject matter may be exhibited for retail sale in respective containers having dimensions only slightly larger than the corresponding dimensions of a single tape cassette. The resulting small size packages readily fit into pockets or purses and, therefore, are subject to pilfering, particularly when exhibited for sale in self-service type stores. Alternatively, these relatively small packages may be displayed in glass enclosed cases or on shelves behind service counters tended by sales personnel. However, it may be found that when potential purchasers are thus restrained from browsing before making a selection, there is a significant drop in sales.

Consequently, there has been developed in the prior art a number of containers having formed therein respective cassette compartments and having respective sizes substantially larger than the size of a single cassette. The resulting relatively large packages are difficult to conceal in conventional wearing apparel and, therefore, discourage pilfering. Thus, the relatively large packages are more adaptable for exhibiting tape cassettes within the reach of customers who may wish to browse prior to making a selection. However, the relatively large packages have not received wide acceptance generally because they are complicated to assemble, require adhesives, and add significantly to the expense of marketing tape cassettes.

SUMMARY OF THE INVENTION

Accordingly, this invention provides a relatively inexpensive package for protectively containing a tape cassette. The package comprises a book-like container and an integral cassette compartment foldably formed in cooperative relationship with one another, without the use of adhesives. The book-like container includes respective front and rear cover walls pivotally connected to a spine side wall for operating in a manner similar to a book when the container is opened and closed. The cassette compartment comprises a rectangular tubular structure pivotally connected to one of the cover walls for enhancing the accessibility of the compartment when installing or removing the cassette, and for pivotally disposing the structure between the cover walls prior to closing the book-like container. A side of the structure is provided with an opening dimensioned for slidably receiving the tape cassette and is disposed with respect to the spine wall, when the container is closed, such that a portion of the cassette protruding from the opening abuts the spine wall and is thereby retained in the compartment.

BRIEF DESCRIPTION OF THE DRAWINGS

For a better understanding of this invention, reference is made in the following more detailed description to the accompanying drawings wherein.

DESCRIPTION OF THE PREFERRED EMBODIMENTS

Figure 1:
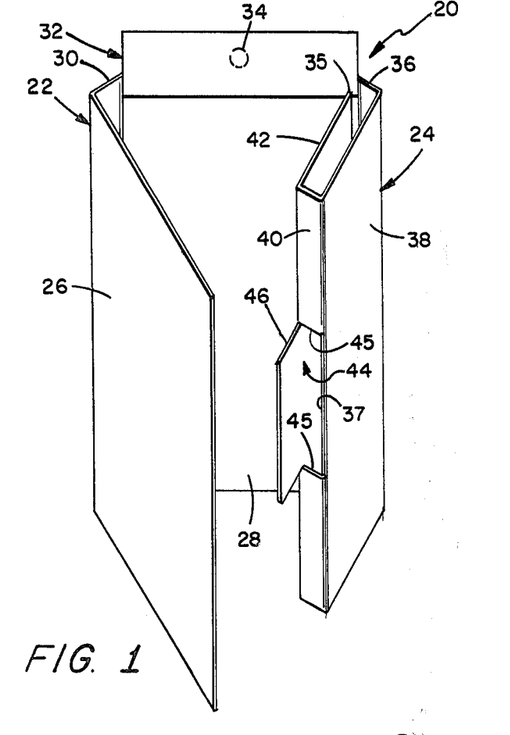
FIG. 1 is a perspective view of a package embodying this invention.

Referring to the drawings wherein like characters of reference designate like parts, there is shown in FIG. 1 a package 20 comprising a book-like container 22 having pivotally connected to it an integral cassette compartment 24. The container 22 includes respective front and rear cover walls 26 and 28 pivotally connected to an integral side wall 30 which serves as the spine of the book-like container. A support hanger 32 having an aperture 34 centrally disposed therein may be integrally connected along a perforated edge to an upper edge portion of the rear cover wall 28.

Compartment 24 is a generally rectangular tubular member having an outer side panel 36 foldably connected to an outer edge portion of the rear cover wall 28. The outer side panel 36 is foldably connected to a first lateral panel 38 which is foldably connected to an inner side panel 40 of the compartment. Inner side panel 40 is foldably connected to a second lateral panel 42 which has a longitudinal terminal edge 35 positionable adjacent the inner surface of outer side panel 36. Disposed in the inner side panel 40 is a slotted opening 44 which communicates with the interior of compartment 24 and has respective narrow edges 45 extended transversely of panel 40. Opening 44 has a longitudinal edge 37 disposed adjacent the first lateral panel 38 and an opposing longitudinal edge adjacent a portion of second lateral panel 42 from which protrudes laterally an extension tab 46.

Figure 2:
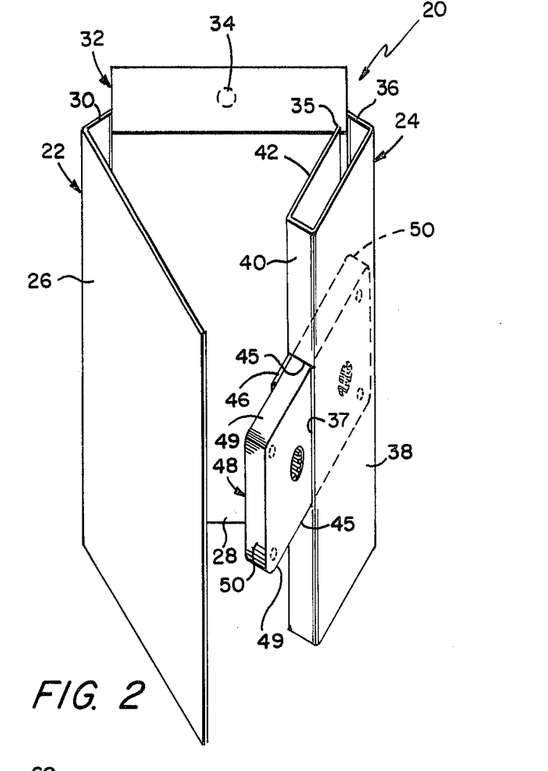
FIG. 2 is a perspective view of the package shown in FIG. 1 having a tape cassette in the compartment portion thereof.

As shown in FIG. 2, the opening 46 is dimensioned for receiving therein an end portion of a conventional tape cassette 48 having respective long end surfaces 49 disposed adjacent the narrow edges 45 of opening 44. The cassette 48 is slidably inserted into the compartment 24 until a short end surface 50 of the cassette abuts the inner surface of outer side panel 36. The compartment 24 then may be pivotally placed against the inner surface of rear cover wall 28; and the front cover wall 26 may be pivotally placed over the compartment 24 to close the container 22 in the manner of a book, for example. As a result, the spine side wall 30 is brought into adjacent or abutting relationship with the other short end surface 50 terminating a protruding end portion of the tape cassette 48 to retain it in compartment 24 when the container 22 is closed.

Figure 3:
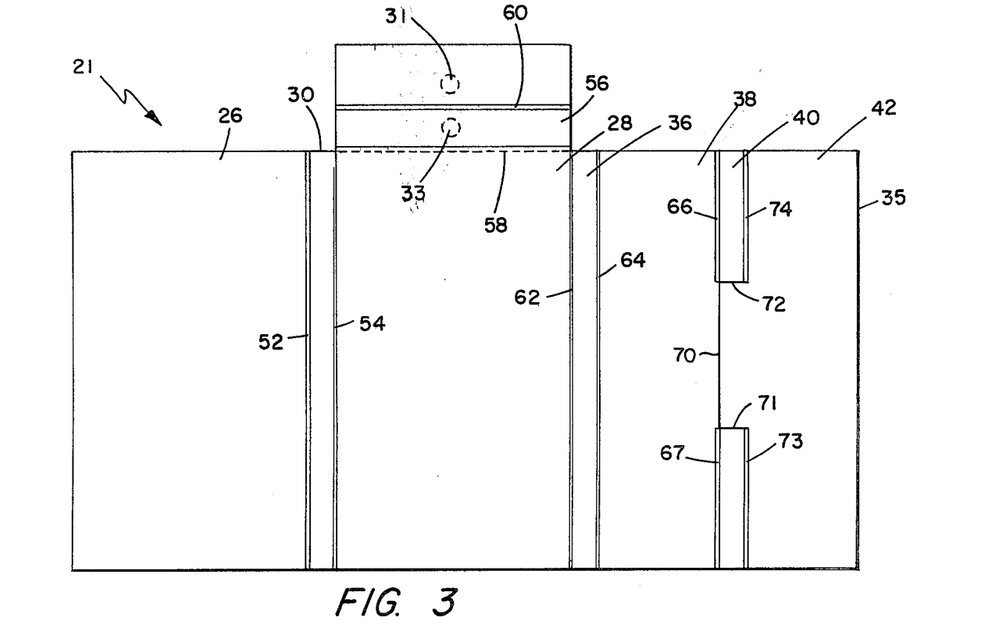
FIG. 3 is a plan view of blank cut and scored for foldably forming the package shown in FIG. 1.

As shown in FIG. 3, the package 20 (FIG. 1) may be fabricated from a single blank 21 of foldable material, such as cardboard for example. The blank 21 terminates at one end in an outer longitudinal edge portion of front cover wall 26. The opposing longitudinal edge portion of front cover wall 26 is integrally connected to an adjacent longitudinal edge of spine side wall 30 along a scored line 52, where the blank 21 is folded and pivotally connects the front cover wall 26 to the spine side wall 30. An opposing longitudinal edge of spine side wall 30 is integrally connected to an adjacent longitudinal edge of rear cover wall 28 along a scored line 54, where the blank 21 is folded and pivotally connects the rear cover wall 28 to the spine side wall 30. An upper edge of rear cover wall 28 is integrally connected to a flap 56 of support hanger 32 (FIG. 1) along a perforated line 58. The flap 56 may comprise two integrally connected portions defined by a scored line 60 along which the flap portions are folded in overlaping relationship with one another to form the support hanger 32. The overlaping portions of flap 56 have respective perforated discs 31, 33 therein disposed in registration with one another to constitute the aperture 34 (FIG. 1) when such discs 31, 33 are removed.

An outer longitudinal edge of rear wall 28 is integrally connected to outer side panel 36 along a scored line 62 where the blank 21 is folded and pivotally connects the compartment 24 to the container 22. The outer side panel 36 has an opposing longitudinal edge integrally connected to first lateral panel 38 along a scored line 64. The opposing longitudinal edge of first lateral panel 38 is integrally connected to inner side panel 40 along a line having scored end portions 66 and 67, respectively, and a cut mid portion 70. The cut mid portion 70 forms the bight or closed end of a U-shaped cut line having legs 71 and 72, respectively, which extend transversely across the inner side panel 40 to form the slotted opening 44 and extension tab 46. The opposing longitudinal edge of inner side panel 40 is integrally connected to the second lateral panel 42 along collinear scored lines 73 and 74, respectively. Second lateral panel 42 has an opposing longitudinal edge 35 which constitutes the other terminal end of blank 21.

Figure 4A:
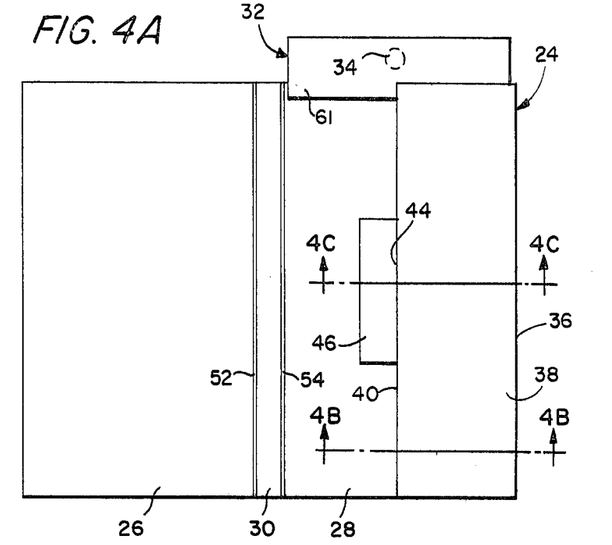
FIG. 4A is a plan view of the blank shown in FIG. 3 partly folded to form the support hanger and compartment portion of the package shown in FIG. 1.
Figure 4B:
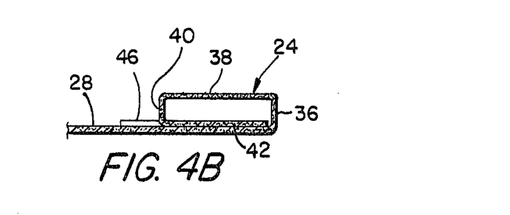
FIG. 4B is a transverse view, partly in section, as taken along the line 4B—4B shown in FIG. 4A and looking in the direction of the arrows.
Figure 4C:
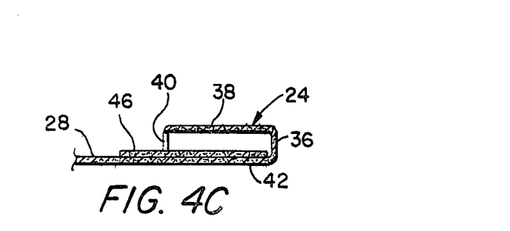
FIG. 4C is a transverse view, partly in section, as taken along the line 4C—4C shown in FIG. 4A and looking in the direction of the arrows.

As shown in FIGS. 4A-4C, the flap 56 (FIG. 3) is folded along the scored line 60 to form the support hanger 32, and place a terminal edge portion 61 thereof against the inner upper surface portion of rear cover wall 28. Then, the blank may be folded along the scored line 62 (FIG. 3) to dispose the panels of compartment 24 at an angle to the rear cover wall 28. The blank 21 then may be folded along the scored lines 73 and 74 to cause the extension tab 46 to break away from inner side panel 40 and first lateral panel 38. Thus, the slotted opening 44 is formed in the inner side panel 40; and second lateral panel 42, as well as extension tab 46, is disposed substantially orthogonal thereto. Then, the blank 21 is folded along the line having scored end portions 66 and 67 to form inner side panel 40 substantially orthogonal to the first lateral panel 38, and bring second lateral panel 42 into spaced opposing relationship with the first lateral panel 38. The blank 21 then is folded along the scored lines 62 and 64, respectively, to form outer side panel 36 in spaced opposing relationship with the inner side panel 40, and position the longitudinal terminal edge of second lateral panel 42 adjacent the inner surface of outer side panel 36. As a result, the second lateral panel 42 and the extension tab 46 are brought into overlying relationship with the inner surface of rear cover wall 28, and retain the support hanger 32 in its folded position. Also, the inner side panel 40 and the slot 42 therein are disposed in predetermined spaced relationship with the scored line 54, as shown in FIGS. 4B and 4C.

Figure 5A:
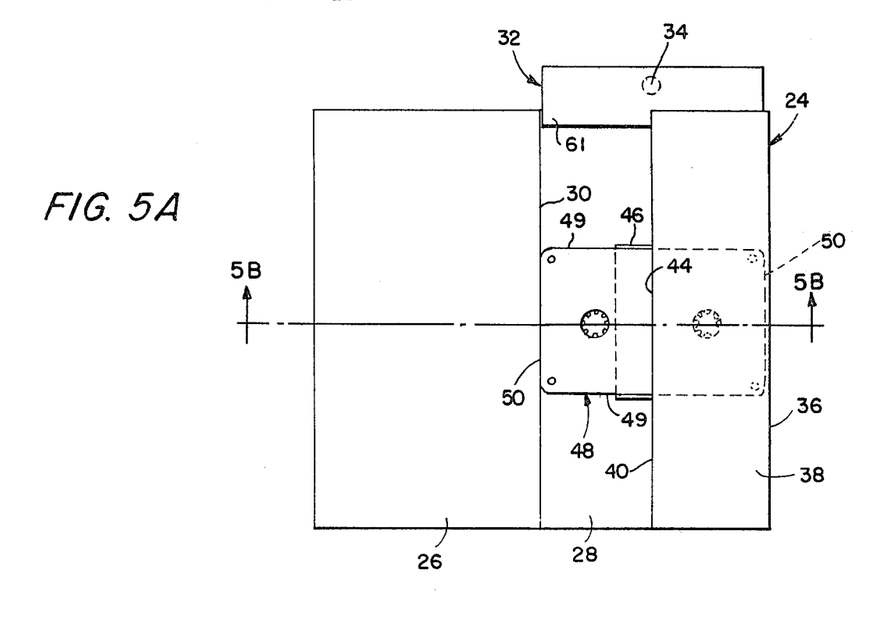
FIG. 5A is a plan view of the partly folded blank shown in FIG. 4A further folded and having a tape cassette in the compartment portion.
Figure 5B:
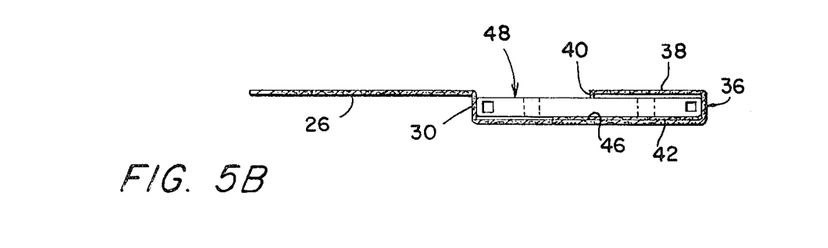
FIG. 5B is a cross-sectional view taken along the line 5B—5B shown in FIG. 5A and looking in the direction of arrows.

As shown in FIGS. 5A-5B, an end portion of the tape cassette 48 slidably inserted into slotted opening 44 extends across compartment 24 to the inner surface of outer side panel 36. The opposing end portion of tape cassette 46 protrudes out of the slotted opening 44 and terminates adjacent the scored line 54 (FIG. 4A). As a result, the weight of cassette 46 causes the pivotal compartment 24 to press against the terminal edge portion 61 of support hanger 32, when the cassette faces up, as shown, and effectively lock the support hanger 32 in the folded position.

The blank 21 is then folded along the scored line 54 (FIG. 4A) to form the spine side wall 30 in juxtaposed or abutting relationship with the adjacent end surface 50 of tape cassette 48, thereby retaining the tape cassette 48 within compartment 24. Thus, it may be seen that the respective outer and inner side panels 36 and 40 are provided with width dimensions that are slightly greater than the thickness of tape cassette 48 to provide the compartment 24 with an inner thickness dimension suitable for slidably inserting the tape cassette 48 between the respective first and second lateral panels 38 and 42. Also, it may be seen that the rear cover wall 28 of container 22 is provided with a width dimension which is substantially equal to or slightly greater than the length of tape cassette 46 in order to locate opposing end surfaces 50 of the tape cassette 46 in adjacent or abutting relationship with the inner surfaces of outer side panel 36 and spine side wall 30, respectively.

Figure 6A:
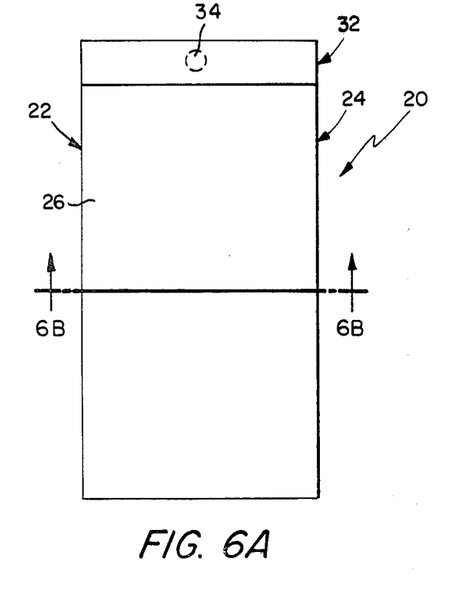
FIG. 6A is a plan view of the blank shown in FIG. 3 fully folded to form the package of this invention.
Figure 6B:
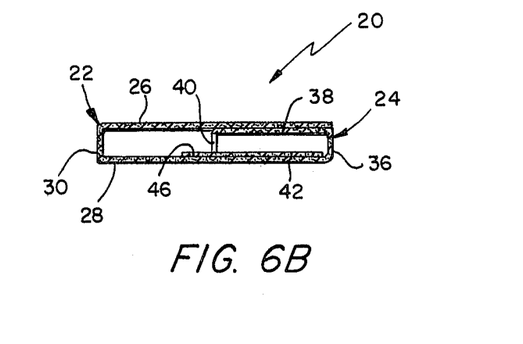
FIG. 6B is a cross-sectional view taken along the line 6B—6B shown in FIG. 6A and looking in the direction of arrows.

As shown in FIGS. 6A-6B, the blank 21 is then folded along the scored line 52 (FIG. 4A) to bring the inner surface of front cover wall 26 into contacting relationship with the first lateral wall 38. Consequently, the front cover wall 26 may have a width dimension substantially equal to the width dimension of rear cover wall 28; and the outer side panel 36 of compartment 24 may serve as an outer side wall of the book-like container 22. Also, it may be seen that the respective outer and inner side panels 36 and 40 preferably have width dimensions substantially equal to or slightly less than the width dimension of spine side wall 30 in order to provide the compartment 24 with a suitable outer thickness dimension for spacing the respective front and rear cover walls 26 and 28 substantially uniformly from one another when the book-like container 22 is closed as described. Accordingly, the package 20 is foldably formed with the book-like container 22 and the integral compartment 24 pivotally connected in co-operating relationship with one another, without the use of adhesives. Also, the pivotally connected compartment 24 may be digitally flipped out of the book-like container 22, as shown in FIGS. 1 and 2, to render the opening 42 more accessible for inserting or removing the tape cassette 48.

Figures 7A, 7B:
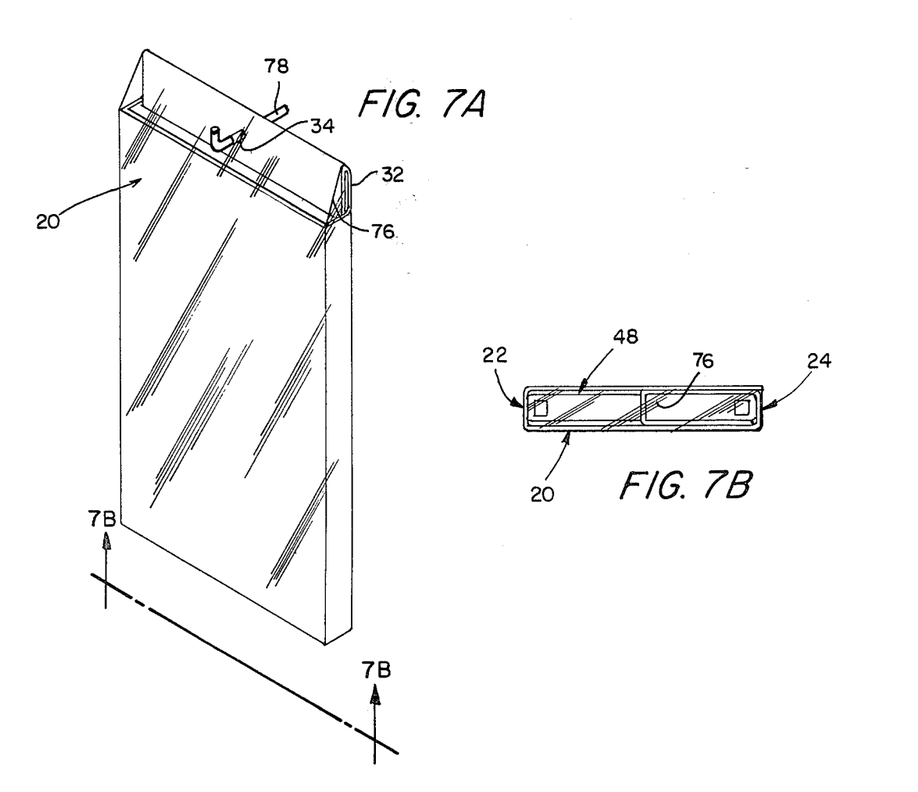
FIG. 7A is a perspective view of a fully wrapped package of this invention as it may be exhibited for sale.
FIG. 7B is a lower end view of the fully wrapped package shown in FIG. 7A.

As shown in FIGS. 7A–7B the package 20 may be entirely enclosed within a transparent wrapping 76 of protective material, such as a shrinkable clear plastic material, for example. The package 20 then may be exhibited for retail sale by pressing a peg 78, such as used in conventional peg board display units, for example, through the aperture 34 in the support hanger 32. Thus, an end view of package 20 discloses that the open end portions of book-like container 22 and the tubular structure of compartment 24 provide means for ascertaining whether or not the cassette 48 is in the package, without removing the wrapping 76 and opening the container 22. Also, it may be seen that the walls 26, 28 and 30 of container 22 may conveniently be provided with appropriate length dimensions for providing the package 20 with a suitable size for discouraging pilferage of the package, particularly when exhibited for retail sale in self-service type stores.

Figure 8:
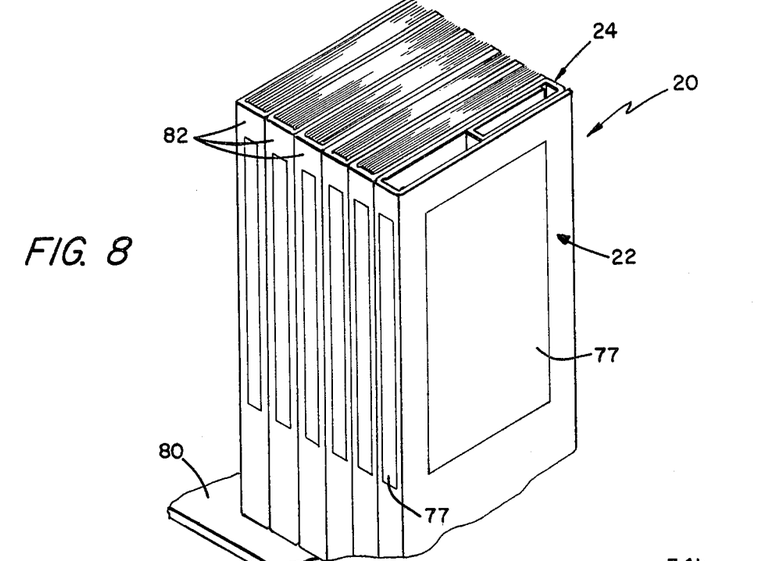
FIG. 8 is a perspective view of the package shown in FIGS. 7A and 7B as it may be stored after sale.

As shown in FIG. 8, after purchase, the wrapping 76 may be removed and the support hanger 32 torn-off along the perforated line 58 (FIG. 3). Then, the package 20 may be stored on a shelf 80, such as in a manner similar to paperback books 82, for example. Thus, the package 20 may be provided with dimensions equivalent to those of conventional paperback books, whereby the package 20 may conveniently be displayed in racks or other types of display units used for exhibiting paperback books for sale. Also, it may be seen that the package 20 has a storing advantage which is useful not only for handling, shipping, and exhibiting the tape cassette 46 for sale, but also is useful for storing the tape cassette 46 after purchase.

Accordingly, the blank 21 shown in FIG. 3 may be provided with book-type labeling 77 (FIG. 8) for identification and advertising purposes. The labeling 77 may comprise alphanumeric or pictorial matter printed on selected portions of the opposing surface of blank 21, such as may be used for mass production of a package 20 for a popular type cassette issue, for example. Alternatively, for limited production means, the single blank 21 and the foldable non-adhesive construction of package 20 lends itself advantageously to the use of a single piece label having an adhesively coated surface secured to the blank 21, and an opposing outer surface provided with alphanumeric or pictorial matter. The single piece label may extend from a particular score line, such as 52 (FIG. 3), for example, over the inner surface of front cover 26, around the longitudinal terminal edge thereof, over the entire opposing outer surfaces of front cover wall 26, spine side wall 30, rear cover wall 28, outer side panel 36, and lateral panel 38 to terminate adjacent the cut line 70 of slot 44. Thus, the package 20 may be provided with identifying and advertising subject matter on all fully exposed surfaces of the book-like container 22 and the compartment 24.

Figure 9:
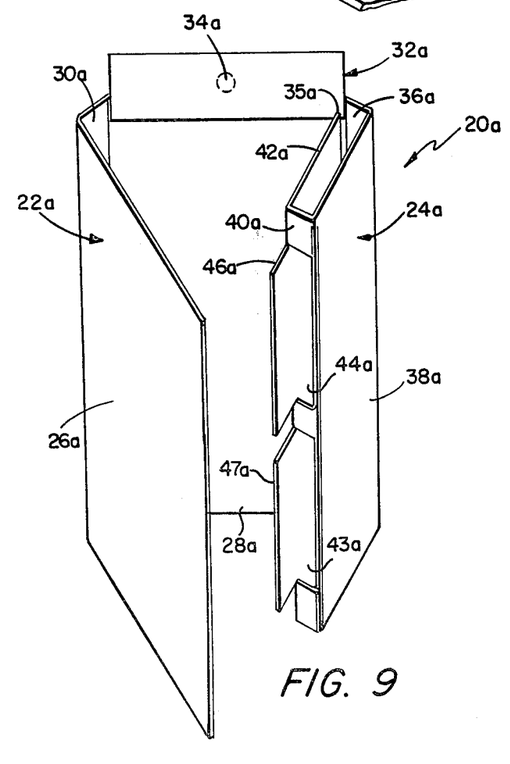
FIG. 9 is a perspective view of an alternative embodiment of this invention.

As shown in FIG. 9, an alternative embodiment 20a may be similar to the package 20 except for the compartment 24a having an inner side panel 40a provided with a plurality of longitudinally spaced openings, such as respective slotted openings 43a and 44a, for example. Each of the respective openings 43a and 44a is dimensioned for slidably receiving therein an end portion of a respective tape cassette (not shown), which has an opposing end portion extended out of the engaged opening. Accordingly, the protruding end portion of the tape cassettes may have respective end surfaces disposed in adjacent or abutting relationship with the inner surface of spine side wall 30a to retain them within the compartment 24a. Thus, it may be seen that the length of package 20a may be determined by the number of tape cassettes to be stored within the book-like container 22a.

Figure 10:
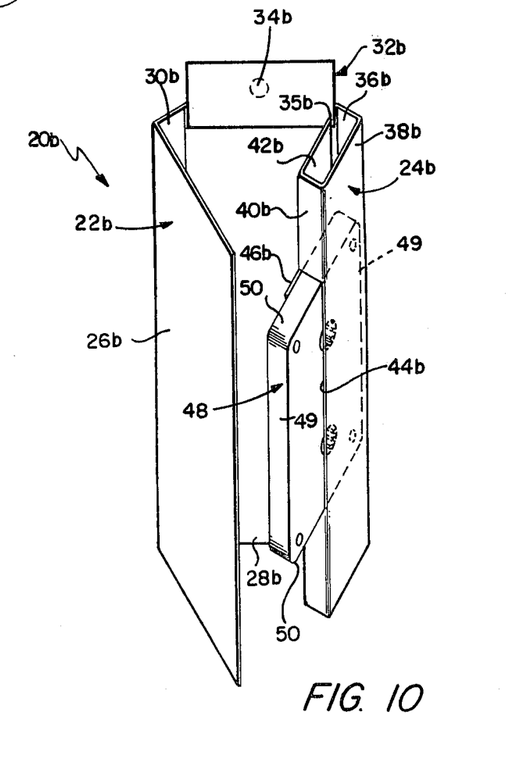
FIG. 10 is a perspective view of another alternative embodiment of this invention.

As shown in FIG. 10, another alternative embodiment 20b may be similar to the package 20 except for the compartment 24b having an inner side panel 40b provided with a slotted opening 44b of greater length than the slotted opening 44. The opening 44b is designed for slidably receiving therein a broader dimensioned end portion of the tape cassette 46. Also, the rear cover wall 28b of container 22b has a width suitable for locating the spine side wall 30b of the container 22b and the outer side panel 36b of compartment 24b in adjacent or abutting relationship with respective opposing end surfaces 49 of the cassette 46, thereby retaining the cassette 46 in compartment 24b when the container 22b is closed on the compartment. Thus, it may be seen that the slotted opening, the compartment, and the container may be provided with any dimensions desired for slidably inserting a cassette type article into the compartment and for retaining it therein by disposing an end surface of the cassette adjacent a wall portion of the container.

From the foregoing it will be apparent that all of the objectives of this invention have been achieved by the structures shown and described herein. It also will be apparent, however, that various changes may be made by those skilled in the art without departing from the spirit of the invention as expressed in the appended claims. For example, the compartment portion of the package need not be the same length as the container portion of the package. Further, the cut formed in the inner side panel 40 of the compartment portion 24 may have a bight end collinear with scored lines 73, 74 either instead of, or in addition, to the bight end 70 disposed collinear with the scored lines 66, 67. It is to be understood, therefore, that all matter shown and described herein is to be interpreted in an illustrative rather than in a limiting sense.

What is claimed is:

1. A package for a tape cassette comprising:
a foldable member having a book-like portion including a pivotal portion integrally connecting first and second unitary covers and having a foldably formed cassette compartment portion disposable between the covers and integrally connected to the first cover along an edge of the first cover, said compartment portion including a first panel disposed in spaced overlaying relationship with the first cover and a side panel connected to the first panel, said side panel having therein a slot disposed between the first cover and the first panel and dimensioned for receiving a portion of the cassette, and said side panel being spaced from said pivotal portion.

2. A package as set forth in claim 1 wherein the cassette compartment is tubular and has at least one open end.

3. A package for a tape cassette comprising:
a foldable member having a book-like portion including a first unitary cover wall and a second unitary cover wall integrally connected to one anothe through a pivotal portion of the foldable member and having a foldably formed cassette compartment portion connected to said first cover wall along an outer edge of said first cover wall, the compartment portion including a first panel disposed in spaced overlaying relationship with the first cover wall, a second panel connected between the outer edge and the first panel; and a third panel connected to the first panel, said third panel having therein a slotted opening dimensioned for slidably receiving the cassette, said third panel being spaced from said pivotal portion of the foldable member.

4. A package as set forth in claim 3 wherein the cassette compartment portion is pivotally connected to said first cover wall along the outer edge.

5. A package for a tape cassette comprising:
a foldable member having integral wall means including a first unitary cover wall, a spine side wall, and a second unitary cover wall connected to one another for forming a book-like container, and having integral panel means foldably connected to said wall means for foldably forming a cassette compartment in the container, the panel means including a first side panel connected to said second cover wall; a first broader panel connected to the first side panel; and a second side panel connected to said broader panel said second side panel having therein a slotted opening dimensioned for slidably receiving a portion of the cassette, said second side panel being spaced from said spine side wall.

6. A package as set forth in claim 5 wherein said first side panel comprises an outer side panel pivotally connected to an outer edge portion of said one of the front and rear walls, and said second side panel comprises an inner side panel having said slotted opening therein.

7. A package as set forth in claim 6 wherein said integral panel means includes a second broader panel connected to the second side panel for disposing in spaced opposing relationship with said broader panel.

8. A package as set forth in claim 6 wherein said integral panel means includes flap panel means connected to an edge portion of said wall means for providing a support hanger.

9. A package as set forth in claim 8 wherein said flap panel means comprises a flap panel having first and second portions connected to one another and having respective apertures therein.

10. A package as set forth in claim 5 wherein the foldable member includes integral label means comprising a unitary label having a surface adhesively secured to respective surfaces of the integral wall means and panel means, and having an opposing surface provided with printed matter.

11. A package for a tape cassette comprising:
a sheet of foldable material including:
a first cover portion;
a second cover portion pivotally connected to the first cover portion along a foldable portion forming a book-like structure; and
a tape cassette compartment portion having a pair of side panel portions, a top panel portion, and a bottom panel portion connected to one another along folds in the sheet of foldable material forming a tubular structure, a first one of the pair of side panel portions being foldably connected to the second cover portion, and a second one of the pair of side panel portions having a slot therein slidably receiving a tape cassette between the top panel portion and the bottom panel portion, and the received tape cassette, the second side wall portion, the top panel portion, and the bottom panel portion being disposed between the surfaces of the first cover portion and the second cover portion when the book-like structure is in the closed position, said foldable portion being spaced from said second one of the side panel portions.

12. A package as set forth in claim 11 wherein said tubular structure has transverse of the book-like structure a dimension less than an outer dimension of the received tape cassette so that a portion of the cassette extends out of said slot.

13. A package for a tape cassette comprising:
a foldable member having a first unitary cover wall and a second unitary cover wall foldably connected to one another along a pivotal portion of the foldable member, and having a cassette compartment portion connected to the said first cover wall along an outer edge of said first cover wall, said compartment portion including a first side panel portion foldably connected to said outer edge, a broader panel portion disposed in spaced overlaying relationship with the first cover wall and connected to said first side panel portion, and a second side panel portion connected to said broader panel portion, said second side panel portion having therein a slotted opening dimensioned for slidably receiving the cassette, the first cover wall having between said pivotal portion of the foldable member and said outer edge a dimension substantially equal to an outer dimension of the tape cassette, and second side panel portion being spaced from said pivotal portion a lesser distance than said first side panel portion.

14. A package for a tape cassette comprising:
a foldable member having a first cover wall and a second cover wall foldably connected to one another along a first portion of the member, and having a cassette compartment portion connected to said first cover wall, the compartment portion including a first panel connected to the first cover wall along a second portion of the foldable member, a narrower side panel connected to the first panel and having a slotted opening therein dimensioned for slidably receiving the cassette, said second portion of the foldable member being spaced from said first portion of the foldable member a distance substantially equal to an outer dimension of the cassette.

15. The package recited in claim 14 wherein the first panel is connected to the first cover wall along a fold formed in the foldable member.

16. A package comprising:
a blank of foldable material having a unitary front cover wall, a spine side wall, and a unitary rear cover wall foldably connected to one another and forming a book-like container, said blank also having integral panel means connected to one of the front and rear cover walls along a fold formed in the foldable material for foldably forming a compartment in the container, the integral panel means including first and second side panels and an interposed panel connected to one another folds formed in the foldable material, and one of said panels being provided with a U-shaped cut having a bight end collinear with one of said folds and having leg portions disposed transversely of one of said side panels and said one of the front and rear cover walls being dimensioned between said spine side wall and said fold to enfold an aritcle therebetween.

17. A package blank comprising:

a first cover wall;

a spine wall connected to the first cover wall along a first scored edge;

a second cover wall connected to the spine wall along a second scored edge;

a first panel connected to the second cover wall along a third scored edge;

a second panel connected to the first wall panel along a fourth scored edge;

a third panel connected to the second panel along a fifth scored edge, said third panel having a slot therein the distance between said fourth and fifth scored edges being less than the distances between said second and third scored edges; and a fourth panel connected to the third panel along a sixth scored edge.

18. The blank recited in claim 17 wherein the first, second, third, fourth, fifth and sixth scored edges are mutually parallel.

19. A package for a tape cassette comprising:

a foldable member having first and second covers pivotally connected to one another along a pivotal portion of of the member and forming a book-like structure, and having a cassette compartment portion disposed between the covers, said compartment portion including a first side panel connected to the first cover, an upper panel connected to the first side panel and disposed in spaced overlaying relationship with the first cover, a second side panel connected to said upper panel, and a lower panel connected to the second side panel and disposed in overlaying relationship with said upper panel, said side panel having therein a slot dimensioned for receiving the cassette between the upper and lower panels said slot being spaced from said pivotal portion exposing a portion of the cassette.

* * * * *

UNITED STATES PATENT OFFICE
CERTIFICATE OF CORRECTION

Patent No. 4,307,806           Dated Dec. 29, 1981

Inventor(s) Carol A. Haubert

It is certified that error appears in the above-identified patent and that said Letters Patent are hereby corrected as shown below:

Col. 8, line 60, "the" should be -- said --;

line 65, after "another" insert -- along --;

line 66, after "said" insert -- side --

Signed and Sealed this

Tenth Day of August 1982

[SEAL]

Attest:

Attesting Officer

GERALD J. MOSSINGHOFF

Commissioner of Patents and Trademarks